US009681449B2

(12) United States Patent
Liu et al.

(10) Patent No.: US 9,681,449 B2
(45) Date of Patent: Jun. 13, 2017

(54) METHOD AND APPARATUS FOR POWER CONTROL IN WIRELESS COMMUNICATION NETWORK

(71) Applicant: Telefonaktiebolaget L M Ericsson (publ), Stockholm (SE)

(72) Inventors: Jinhua Liu, Beijing (CN); Zhiheng Guo, Beijing (CN); Hai Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 137 days.

(21) Appl. No.: 14/433,537

(22) PCT Filed: Oct. 19, 2012

(86) PCT No.: PCT/CN2012/083201
§ 371 (c)(1),
(2) Date: Apr. 3, 2015

(87) PCT Pub. No.: WO2014/059659
PCT Pub. Date: Apr. 24, 2014

(65) Prior Publication Data
US 2015/0264692 A1    Sep. 17, 2015

(51) Int. Cl.
*H04W 72/04* (2009.01)
*H04W 52/24* (2009.01)
(Continued)

(52) U.S. Cl.
CPC ....... *H04W 72/0473* (2013.01); *H04W 24/10* (2013.01); *H04W 52/241* (2013.01);
(Continued)

(58) Field of Classification Search
CPC .......... H04W 72/0473; H04W 52/241; H04W 24/10; H04W 72/085; H04W 52/20; H04W 52/262; H04W 52/146
See application file for complete search history.

(56) References Cited

U.S. PATENT DOCUMENTS

| | | | |
|---|---|---|---|
| 2006/0046789 A1* | 3/2006 | Huh | H04W 52/08 455/571 |
| 2009/0285169 A1* | 11/2009 | Yang | H04W 52/143 370/329 |
| 2010/0002575 A1* | 1/2010 | Eichinger | H04L 5/0046 370/210 |
| 2011/0182337 A1* | 7/2011 | Taoka | H04L 1/0003 375/224 |
| 2011/0275399 A1* | 11/2011 | Englund | H04W 72/1231 455/513 |

(Continued)

FOREIGN PATENT DOCUMENTS

| | | |
|---|---|---|
| CN | 1377526 A | 10/2002 |
| CN | 1491048 A | 4/2004 |

(Continued)

OTHER PUBLICATIONS

Extended European Search Report and Written Opinion for Application No. 12886579.7, mailed Apr. 25, 2016, 5 pages.
(Continued)

*Primary Examiner* — Ajay Cattungal
(74) *Attorney, Agent, or Firm* — Nicholson De Vos Webster & Elliott LLP

(57) ABSTRACT

A method of controlling power in a transmitter in communication with a receiver in a wireless communication network is disclosed. The method comprising measuring a value of a first metric of signals received in the receiver, the first metric usable to generate a power control command; determining a measurement error of the first metric; generating the power control command based on the measured value of the first metric if the measurement error of the first metric does not exceed a threshold; and sending the power control command from the receiver to the transmitter.

20 Claims, 6 Drawing Sheets

(51) Int. Cl.
*H04W 24/10* (2009.01)
*H04W 72/08* (2009.01)
H04W 52/20 (2009.01)
H04W 52/26 (2009.01)
H04W 52/14 (2009.01)

(52) U.S. Cl.
CPC ........ *H04W 72/085* (2013.01); *H04W 52/146* (2013.01); *H04W 52/20* (2013.01); *H04W 52/262* (2013.01)

(56) References Cited

U.S. PATENT DOCUMENTS

2012/0063336 A1* 3/2012 Shany .................. H04B 7/0452
370/252

FOREIGN PATENT DOCUMENTS

| EP | 1 212 839 A1 | 6/2002 |
| EP | 2 544 481 A1 | 1/2013 |
| WO | 01/20789 A1 | 3/2001 |
| WO | 2011/108380 A1 | 9/2011 |

OTHER PUBLICATIONS

International Search Report and Written Opinion for International Application No. PCT/CN2012/083201, mailed Aug. 1, 2013, 11 pages.
International Preliminary Report on Patentability for Application No. PCT/CN2012/083201, mailed Apr. 21, 2015, 7 pages.

* cited by examiner

METHOD AND APPARATUS FOR POWER CONTROL IN WIRELESS COMMUNICATION NETWORK

CROSS-REFERENCE TO RELATED APPLICATIONS

This application is a National stage of International Application No. PCT/CN2012/083201, filed Oct. 19, 2012, which is hereby incorporated by reference.

TECHNICAL FIELD

The present application relates to telecommunications, and in particular to controlling power in a transmitter in communication with a receiver in a wireless communication network.

BACKGROUND

Power control methods are often implemented within wireless communication systems to minimize transmission power while still maintaining a desired communication performance level.

In 3G systems, a nested loop structure having an outer loop and an inner loop is used to control transmit power. In the outer loop, a target of SINR (Signal to Interference and Noise Ratio), RSCP (Received Signal Code Power), SNR (Signal to Noise Ratio) or other metrics for the receiver is adjusted so that a configured or predetermined BLER (BLock Error Rate) target for data transmission can be met. In the inner loop, a measured value of a metric such as SIR, SINR etc. for a received signal is compared to the target value of the metric. A TPC (Transmit Power Control) command may then be generated for delivery to the transmitter based on the result of the comparison (e.g., indicating whether transmit power modifications are desirable).

In 4G systems, similarly, a predetermined or configured target of a metric such as SINR, RSCP, SNR or other metrics for each UE is used. There is a closed loop power control which adjusts the transmission power of the UE with the generated TPC command by comparing the predetermined or configured target and the measured value of the metric.

It can be seen that according to existing power control methods, the power control command is generated based on the target value and the measured value of a certain metric without considering the measurement or estimation error of the metric. However, as observed in field tests of an uplink power control, for example, the UE performance is seriously deteriorated when there is a large measurement error of a metric usable to generate power control command, which is undesirable.

SUMMARY OF INVENTION

It is therefore one of the objectives of the present application to provide a mechanism for controlling power in a transmitter in communication with a receiver in a wireless communication network, in order to efficiently improve the performance of the system including the transmitter and the receiver in different situations.

According to one embodiment of the present invention, there is provided a method of controlling power in a transmitter in communication with a receiver in a wireless communication network. The method comprises the steps of measuring a first metric of signals received UI the receiver which is usable to generate a power control command, determining a measurement error of the first metric and generating the power control command based on measured value of the first metric if the measurement error of the first metric does not exceed a threshold. In this way, the power control command is generated, taking the measurement error of the first metric into account. Then, the power control command is sent from the receiver to the transmitter. Preferably, the method may further comprise the steps of measuring a second metric of the signals received in the receiver which is usable to generate the power control command and generating the power control command based on measured value of the second metric if the measurement error of the first metric exceeds the threshold. Alternatively, the power control command is generated based on measured value of the first metric if the measurement error of the first metric does not exceed a first threshold and based on measured value of the second metric if the measurement error of the first metric exceeds a second threshold.

According to another embodiment of the present invention, there is provided a method of controlling power in a transmitter in communication with a receiver in a wireless communication network. The method comprises the steps of measuring two or more metrics of signals received in the receiver which are usable to generate a power control command, determining measurement errors of said two or more metrics, selecting a metric with the minimum measurement error from said two or more metrics, generating the power control command based on the selected metric and sending the power control command from the receiver to the transmitter. In this method, the metric with minimum measurement error is selected to generate the power control command such that the transmit power will be adjusted in a relatively accurate manner in the transmitter.

According to another embodiment of the present invention, there is provided a method of controlling power in a transmitter in communication with a receiver in a wireless communication network. The method comprises the steps of measuring a metric of signals received in the receiver, determining a measurement error of the metric, determining an effective value of the metric based on measured value of the metric and the measurement error of the metric, generating a power control command based on the determined effective value of the metric if the measurement error of the metric exceeds a threshold and sending the power control command from the receiver to the transmitter. In this method, the effective value rather than the measured value of the metric is used to generate the power control command when the measurement error of the metric exceeds a threshold which may indicate an unacceptable measurement error.

According to another embodiment of the present invention, there is provided a wireless receiver comprising a first measuring unit, a determining unit and a first generating unit. The first measuring unit is configured for measuring a first metric of signals received in the receiver, the first metric usable to generate a power control command. The determining unit is configured for determining a measurement error of the first metric. And the first generating unit is configured for generating the power control command based on measured value of the first metric if the measurement error of the first metric does not exceed a threshold.

According to another embodiment of the present invention, there is provided a wireless receiver comprising a measuring unit, a determining unit, a selecting unit and a generating unit. The measuring unit is configured for measuring two or more metrics of signals received in the receiver, the metrics usable to generate a power control command. The determining unit is configured for determining measurement errors of said two or more metrics. The selecting unit is configured for selecting a metric with the minimum measurement error from said two or more metrics. And the generating unit is configured for generating the power control command based on the selected metric.

According to another embodiment of the present invention, there is provided a wireless receiver comprising a processor. The processor of the wireless receiver is configured to measure a metric of signals received in the receiver, determine a measurement error of the metric, determine an effective value of the metric based on measured value of the metric and the measurement error of the metric and generate a power control command based on the determined effective value of the metric if the measurement error of the metric exceeds a threshold.

According to another embodiment of the present invention, there is provided a mobile terminal or base station comprising the wireless receiver as stated in previous embodiments.

It should be emphasized that the embodiments of the invention described above are merely possible examples, among others, of the implementations, setting forth a clear understanding of the principles of the invention. Other details and advantages of the invention will become apparent from the following detailed description in combination with the accompanying figures illustrating the principles and operation of the invention.

BRIEF DESCRIPTION OF THE DRAWINGS

Various embodiments and aspects of the invention are described in detail below with reference to the accompanying figures. It is to be appreciated that the accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Certain terms are used throughout the description and following claims to refer to particular components. As one skilled in the art will appreciate, electronic equipment manufactures may refer to a component by different names. This document does not intend to distinguish between components that differ in name but not function. It should be emphasized that the term "comprises/comprising" when used in this specification is taken to specify the presence of stated features, integers, steps or components but does not preclude the presence or addition of one or more other features, integers, steps, components or groups thereof. Also, as used in the specification including the appended claims, the singular forms "a", "an", and "the" include the plural unless the context clearly dictates otherwise.

In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
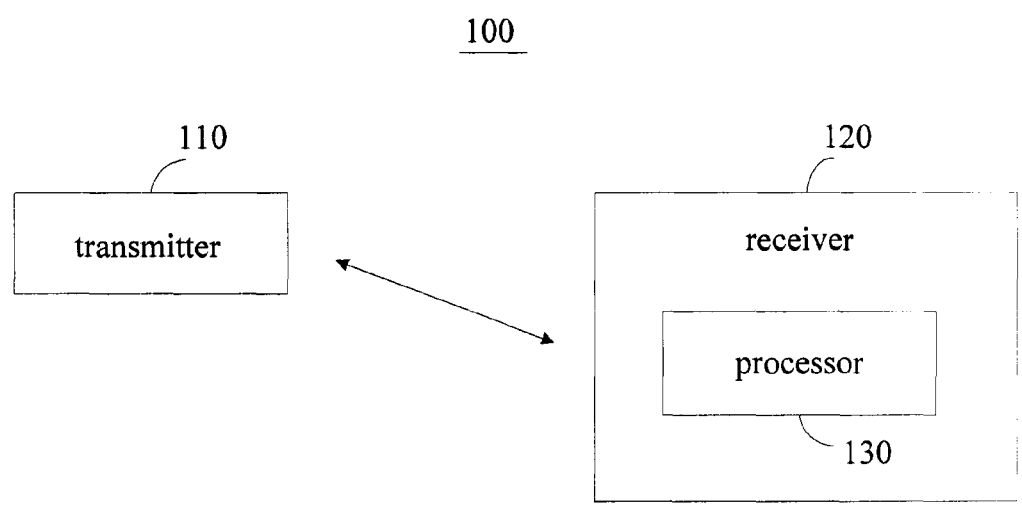
FIG. 1 illustrates a wireless communication system according to one embodiment of the present invention.

FIG. 1 illustrates an embodiment of a wireless communication system 100 including a transmitter 110 and a receiver 120. The transmitter 110 is in communication with the receiver 120. Though FIG. 1 shows a single transmitter 110 and a single receiver 120, those skilled in the art will appreciate that the wireless communication system 100 may comprise two or more transmitters 110 and receivers 120. The transmitter 110 transmits data to the receiver 120 over one or more uplink or downlink channels. The downlink and uplink channels may comprise dedicated channels, common channels, or a mixture thereof. The term "transmitter" as used herein refers to base station (also called NodeB, eNodeB etc.) for downlink communication and to mobile terminal (also called user equipment (UE), mobile station etc.) for uplink communication. Likewise, the term "receiver" as used herein refers to mobile terminal for downlink communication and to base station for uplink communication.

As shown in FIG. 1, the receiver 120 have a processor 130 for processing received signals such that the receiver 120 may be able to generate a power control command and send it to the transmitter 110 to adjust its transmit power. According to existing power control methods, the power control command was generated based on the target value and measured value of a metric such as SINR of the received signals. For example, if the measured value of SINR was lower than the target SINR, a power control command 'UP' indicating to increase transmit power of the transmitter would be generated. Otherwise, a power control command 'DOWN' indicating to decrease transmit power would be generated.

However, in certain cases, the measured accuracy of the metric usable to generate the power control command cannot be ensured. For SNR based power control, for example, the accuracy of noise measurement is important in order to get an accurate SNR. However, in practice, the noise is measured in a window within which no signal is assumed to be transmitted. In fact, there is no well defined time window or there are exceptional interferences within this window, which results in inaccuracy of the noise measurement. The measurement error can be further enlarged in the weight matrix calculation for IRC (Interference Rejection Combiner) receiver since fixed point calculation is used and the truncation error can be large when there are both weak signal and strong signal in the same matrix.

As can be appreciated, if the accuracy of a metric cannot be ensured, the performance of the power control based on the metric will be impacted. For example, due to the measurement error, there is a clear transmit data rate decrease while there are still much transmit power left. For another example, lots of transmission opportunities might be wasted due to high BLER (BLock Error Rate) which may result from SINR measurement error.

Figure 2:
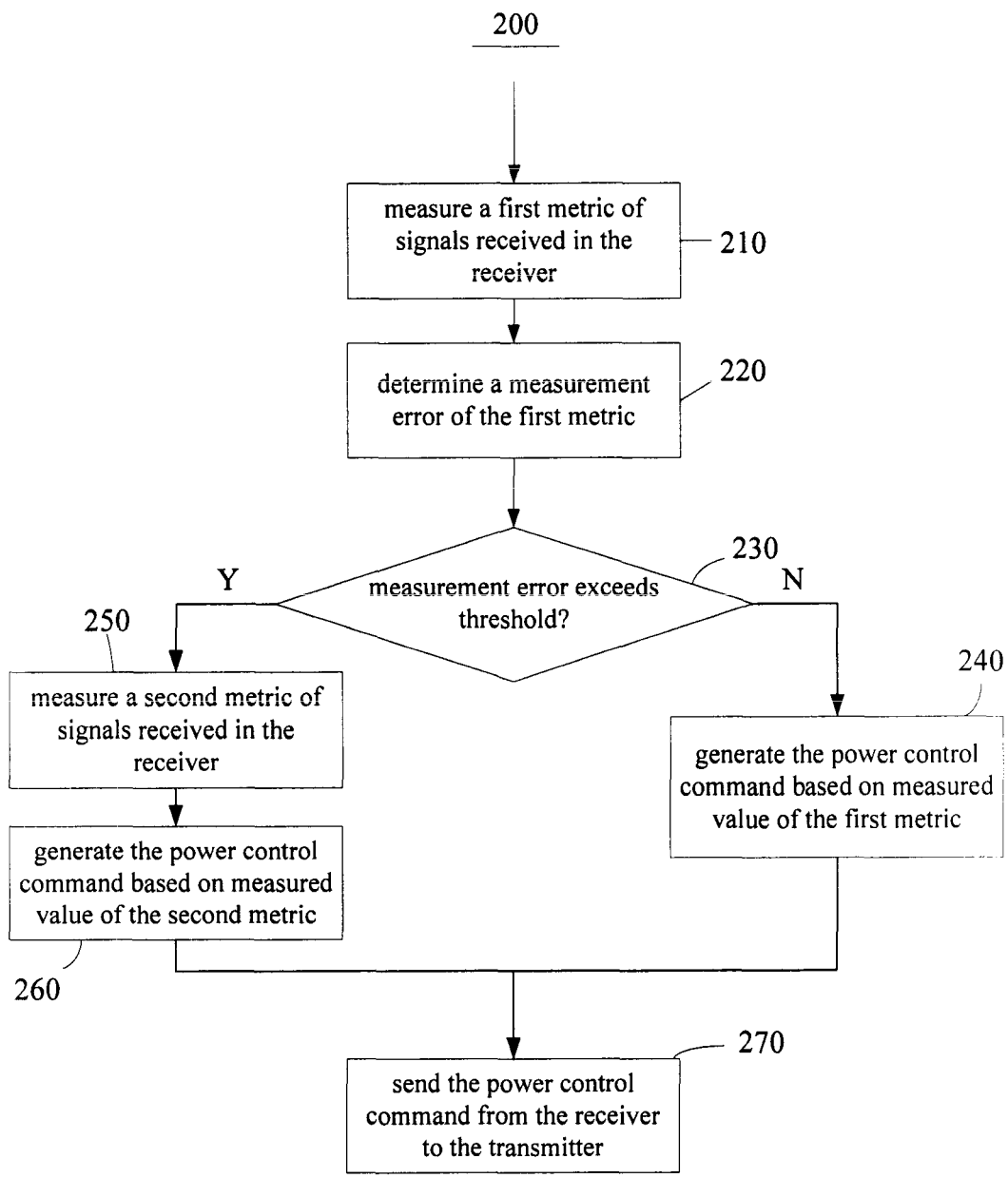
FIG. 2 is a flow diagram of an example method for power control according to one embodiment of the invention.

In order to improve the transmit power control, referring to FIG. 2, there is provided a method 200 of controlling power in a transmitter in communication with a receiver in a wireless communication network. The method 200 comprises measuring a first metric of signals received in the receiver, the first metric usable to generate a power control command (step 210). At step 220, a measurement error of the first metric is determined. Then, at step 230, it is determined whether the measurement error of the first metric exceeds a threshold. If no, the power control command will be generated based on measured value of the first metric (step 240) for transmission. Alternatively, the power control command could be generated based on effective value of the first metric. The effective value is obtained based on the measured value and the measurement error of the first metric.

If the measurement error of the first metric exceeds the threshold, a second metric will be measured in the receiver (step 250). Then, the power control command is generated based on measured value of the second metric (step 260). At step 270, the power control command is sent from the receiver to the transmitter. Alternatively, the power control command could be generated based on effective value of the second metric. The effective value is obtained based on the measured value and the measurement error of the second metric.

In contrast to the existing power control methods, according to the present invention, the power control command is generated, taking the measurement error of the metric into consideration. In this way, the power control in the transmitter may be more accurate. Further, although in the method as shown in FIG. 2 only one threshold is used, it should be appreciated that two different thresholds may be used. That is, the power control command is generated based on measured value of the first metric if the measurement error of the first metric does not exceed a first threshold and based on measured value of the second metric if the measurement error of the first metric exceeds a second threshold. Preferably, the second threshold is equal to or higher than the first threshold.

The terms "first metric" and "second metric" as used herein may refer to any metric that can be used to generate a power control command. In one case, the first metric is SINR (Signal to Interference and Noise Ratio) and the second metric is any one of SNR (Signal to Noise Ratio), received signal power density and receiver signal power. Usually, the measurement error of SNR or received signal power density cab be within a certain range when the receiver signal power is within the dynamic range of the receiver while the SINR measurement error depends on multiple other factors such as receiver algorithms. Therefore, if the SINR measurement error exceeds a threshold indicating unacceptable SINR measurement error, a second metric instead of SINR can be used to generate the power control command to improve the system performance.

For example, for SINR measurement error based power control, if the determined SINR measurement error is higher than a predetermined threshold$_{SINR\_error, high}$, then a second metric like SNR or received signal power is used to generate the power control command. More preferably, the power control command would be generated based on the SINR again only if the SINR measurement error was lower than another predetermined threshold$_{SINR\_error, normal}$.

It is preferable that the threshold depends on the modulation scheme associated with the received signal since different modulation schemes have different impairment susceptibilities. In this way, the accuracy of power control in the transmitter can be further ensured.

In one embodiment, the power control is SINR based and there is a SINR target which is optimized to maximize the user and system performance. The SINR measurement error can be determined according to $$SINR_{err} = SINR_{adjusted} + f(BLER) - SINR_{meas}$$

where $SINR_{err}$ is SINR measurement error, $SINR_{meas}$ is measured SINR, $SINR_{adjusted}$ is adjusted SINR and f(BLER) is SINR offset estimated based on an achieved BLER and a predetermined BLER target of the signals received.

According to one embodiment of the present invention, the adjusted SINR equals to the measured SINR plus an offset value, and the offset value is adapted according to the achieved BLER. The delta value is increased with one step when a data block is correctly received while decreased with another step when a data block is not correctly received. The higher BLER is, the smaller the delta value is. In some cases, the adjusted SINR is regarded as the expected SINR based on which a MCSI (Modulation and Coding Scheme Indicator) is selected.

According to one embodiment of the present invention, f(BLER) is positive when the achieved BLER is lower than the predetermined BLER target and f(BLER) is negative when the achieved BLER is higher than the predetermined BLER target.

In one embodiment, the SINR measurement error can be determined or updated periodically, for instance every 100 ms. A certain filtering can be used in the determination of SINR measurement error. In one case, the measured SINR and the adjusted SINR can be a filtered value with the average filter in each period of $SINR_{err}$ determination. In a preferred embodiment, a further filtering can be applied for $SINR_{err}$ determination. As an example, a simple attack decay filter can be used:

$$\overline{SINR_{err}}(n) = \overline{SINR_{err}}(n-1)\cdot(1-\alpha) + SINR_{err}\cdot\alpha$$

where $\overline{SINR_{err}}$ is the filtered SINR measurement error, n is the current $SINR_{err}$ determination period, and $\alpha$ is the filtering coefficient between 0~1.

Figure 3:
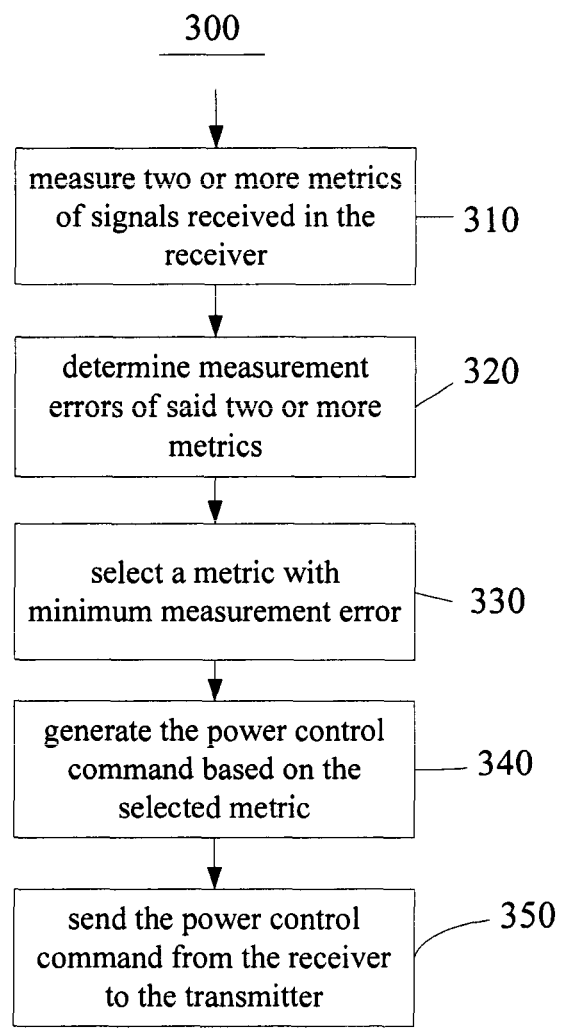
FIG. 3 is a flow diagram of an example method for power control according to one embodiment of the invention.

FIG. 3 shows a flow diagram of an example method 300 for power control according to one embodiment of the invention. At step 310, two or more metrics of signals received in the receiver are measured. The two or more metrics are usable to generate a power control command. At step 320, measurement errors of the two or more metrics are determined. At step 330, a metric with minimum measurement error is selected. Then, at step 340, the power control command is generated based on the selected metric. Usually, the power control command is generated based on the measured value of the selected metric. Alternatively, the power control command could be generated based on the effective value of the selected metric. The effective value is obtained based on the measured value and the measurement error of the selected metric. At step 350, the power control command is sent from the receiver to the transmitter.

In the embodiment as shown in FIG. 3, the metric with minimum measurement error is selected to generate the power control command such that transmit power will be adjusted in a relatively accurate manner in the transmitter.

By way of illustration, and not limitation, for example, the two or more metrics can be any of SINR, SNR, received signal power density and receiver signal power.

It is preferable that a new metric is selected when the measurement error of the new metric is x dB lower than that of the original metric for power control command generation, where x can be either uniform or different value between different metrics. By doing this, a frequent switch between different metrics is avoided so that the system stability is enhanced.

In one embodiment, the power control is SINR based and there is a SINR target which is optimized to maximize the user and system performance. The SINR measurement error can be determined according to $$SINR_{err}=SINR_{adjusted}+f(BLER)-SINR_{meas}$$

where $SINR_{err}$ is SINR measurement error, $SINR_{meas}$ is measured SINR, $SINR_{adjusted}$ is adjusted SINR and f(BLER) is SINR offset estimated based on an achieved BLER and a predetermined BLER target of the signals received.

In one embodiment, the adjusted SINR equals to the measured SINR plus an offset value, and the offset value is adapted according to the achieved BLER. The delta value is increased with one step when a data block is correctly received while decreased with another step when a data block is not correctly received. The higher BLER is, the smaller the delta value is. In some cases, the adjusted SINR is regarded as the expected SINR based on which a MCSI (Modulation and Coding Scheme Indicator) is selected.

In one embodiment, f(BLER) is positive when the achieved BLER is lower than the predetermined BLER target and f(BLER) is negative when the achieved BLER is higher than the predetermined BLER target.

Figure 4:
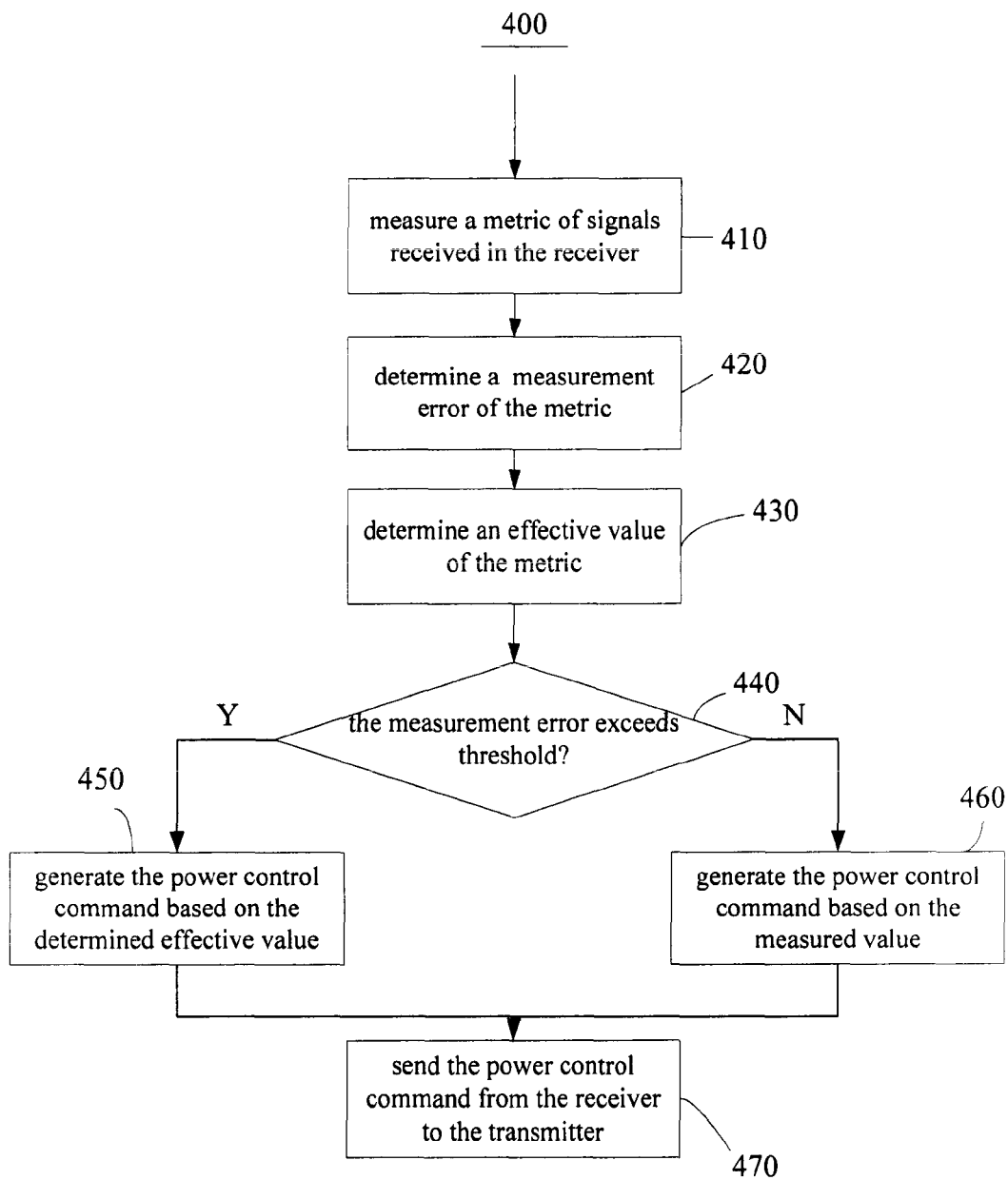
FIG. 4 is a flow diagram of an example method for power control according to one embodiment of the invention.

Turning to FIG. 4 now, a flow diagram of an example method 400 for power control according to one embodiment of the invention is disclosed. At step 410, a metric of signals received in the receiver is measured where the metric is usable to generate a power control command. Then, at step 420, a measurement error of the metric is determined. At step 430, an effective value of the metric is determined based on measured value of the metric and the measurement error of the metric. At step 440, it is determined whether the measurement error exceeds a threshold. If yes, the power control command is generated based on the determined effective value of the metric (step 450) and otherwise the power control command is generated based on the measured value of the metric (step 460). At step 470, the power control command is sent from the receiver to the transmitter.

It should be noted that the metric as used herein may refer to any of SINR, SNR, received signal power density and receiver signal power.

Suppose that the metric is SINR. Then, in one embodiment of the present invention, the effective SINR can be determined according to $$SINR_{eff}=SINR_{meas}+SINR_{err}$$

where $SINR_{eff}$ is the effective SINR, $SINR_{err}$ is the SINR measurement error and $SINR_{meas}$ is the measured SINR. It is worth mentioning that the SINR measurement error can be determined according to the methods as depicted in the previous description.

Another way to determine the effective SINR can be based on the selected MCSI, since each different MCSI corresponds to a different required SINR level in order to reach a certain BLER target. Then the effect SINR can be determined according to $$SINR_{eff}=SINR_{req,mcsi}+\Delta$$

where $SINR_{req,mcsi}$ is the required SINR of the correctly received or selected MCSIs and $\Delta$ is the margin to conquer possible channel variations.

Figure 5:
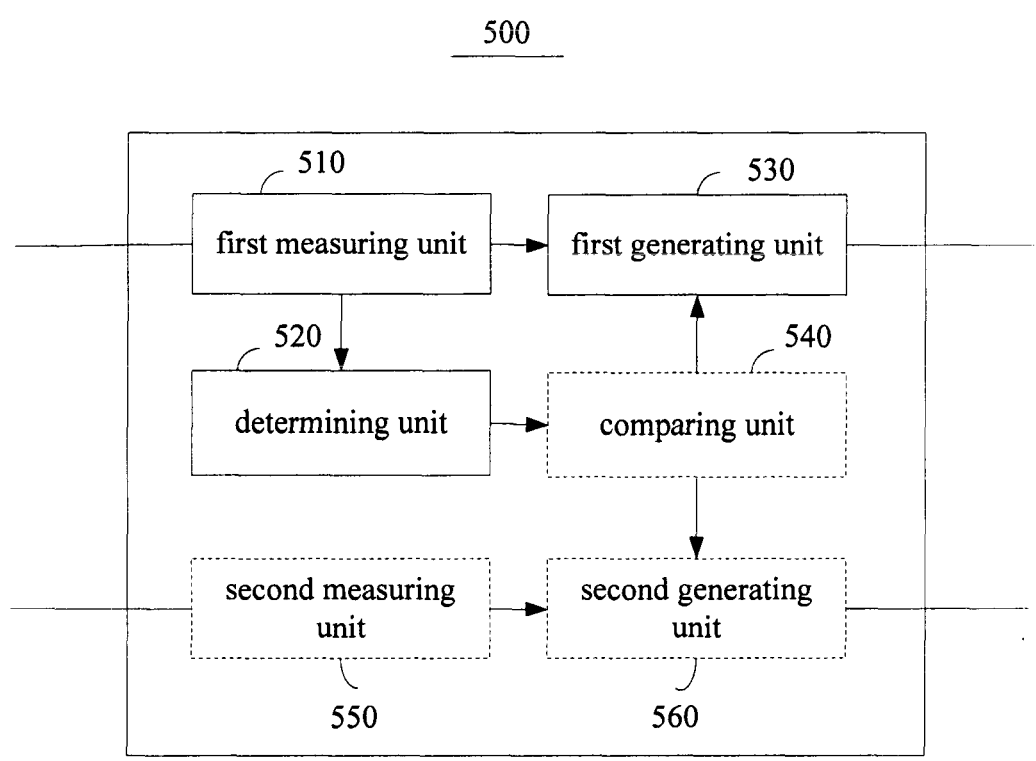
FIG. 5 is a block diagram of an example wireless receiver according to one embodiment of the invention.

FIG. 5 illustrates an example wireless receiver 500 according to one embodiment of the invention. In the wireless receiver as shown in FIG. 5, there exists a first measuring 510, a determining unit 520 and a first generating unit 530. The first measuring unit 510 is configured for measuring a first metric of signals received in the receiver, the first metric usable to generate a power control command. The determining unit 520 is configured for determining a measurement error of the first metric. The first generating unit 530 is configured for generating the power control command based on measured value of the first metric if the measurement error of the first metric does not exceed a threshold.

It is preferable that a comparing unit 540 comprised in the wireless receiver 500 is used for comparing the measurement error of the first metric with the threshold. It is also preferable that the wireless receiver 500 may comprise a second measuring unit 550 for measuring a second metric of the signals received in the receiver and a second generating unit 560 for generating the power control command based on the measured value of the second metric if the measurement error of the first metric exceeds the threshold.

It will be readily known by the person skilled in the art that in addition to those units as shown in FIG. 5, the wireless receiver 500 may further comprise a sending unit (not illustrated) for sending the power control command from the receiver to the transmitter.

Figure 6:
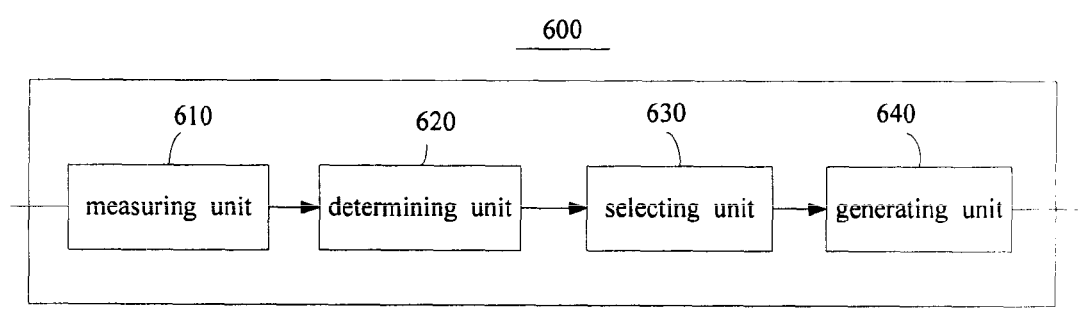
FIG. 6 is a block diagram of an example wireless receiver according to one embodiment of the invention.

According to another embodiment of the present invention, as shown in FIG. 6, there is provided a wireless receiver 600 comprising a measuring unit 610 for measuring two or more metrics of signals received in the receiver, a determining unit 620 for determining measurement error of the two or more metrics, a selecting unit 630 for selecting a metric with minimum measurement error from the two or more metrics and a generating unit 640 for generating a power control command based on the selected metric.

According to another embodiment of the present invention, there is provided a wireless receiver comprising a processor. The processor of the wireless receiver is configured to measure a metric of signals received in the receiver, determine a measurement error of the metric, determine an effective value of the metric based on measured value of the metric and the measurement error of the metric and generate a power control command based on the determined effective value of the metric if the measurement error of the metric exceeds a threshold.

It should be understood that the units or modules described are for illustrative purpose only and may be implemented by combining or distributing functions among the units as would be understood by a person skilled in the art.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

The implementation of the present invention can be very attractive to extend the scope of using MU-MIMO, e.g. to pair a good UE and a bad UE, which can result in clear SINR measurement error for the good UE since the receiver implementation needs to protect the bad user usually. Further, the implementation of the present invention can improve the UE and system performance when there is a clear measurement error of a metric such as SINR. The SINR determination can be a very important issue for power control, especially for advanced receivers with complex signal processing procedure.

Having thus described several aspects and embodiments of the invention, modifications and/or improvements may be apparent to those skilled in the art and are intended to be part of this disclosure. For example, the above description is focused on the fingerprinting technology, but it is to be appreciated that the invention is applicable to all fingerprinting-like positioning methods that the principles of the invention may be used in a wide variety of applications. The above description is therefore by way of example only, and includes any modifications and improvements that may be apparent to one of skill in the art. The scope of the invention should be determined from proper construction of the appended claims and their equivalents.

What is claimed is:

1. A method of controlling power in a transmitter in communication with a receiver in a wireless communication network, comprising:
   measuring a value of a first metric of signals received in the receiver, the value of the first metric usable to generate a power control command;
   determining a measurement error of the value of the first metric;
   generating the power control command based on the measured value of the first metric if the measurement error of the measured value of the first metric does not exceed a first threshold; and
   sending the power control command from the receiver to the transmitter.

2. The method according to claim 1, further comprising:
   measuring a value of a second metric of the signals received in the receiver, the measured value of the second metric usable to generate the power control command; and
   generating the power control command based on the measured value of the second metric if the measurement error of the measured value of the first metric exceeds a second threshold, wherein the second threshold is equal to or higher than the first threshold.

3. The method according to claim 2, wherein the first metric is SINR (Signal to Interference and Noise Ratio) and the second metric is any one of SNR (Signal to Noise Ratio), received signal power density and receiver signal power.

4. The method according to claim 3, wherein the measurement error of SINR is determined according to $$SINR_{err} = SINR_{adjusted} + f(BLER) - SINR_{meas}$$

where $SINR_{err}$ is SINR measurement error; $SINR_{meas}$ is measured SINR; $SINR_{adjusted}$ is adjusted SINR; f(BLER) is SINR offset estimated based on an achieved BLER (BLock Error Rate) and a predetermined BLER target of the signals received.

5. The method according to claim 4, wherein $SINR_{adjusted}$ equals to the measured SINR plus an offset value, and the offset value is adapted according to the achieved BLER.

6. The method according to claim 4, wherein f(BLER) is positive when the achieved BLER is lower than the predetermined BLER target and f(BLER) is negative when the achieved BLER is higher than the predetermined BLER target.

7. A method of controlling power in a transmitter in communication with a receiver in a wireless communication network, comprising:
   measuring values of two or more metrics of signals received in the receiver, said values of two or more metrics usable to generate a power control command;
   determining measurement errors of said values of the two or more metrics;
   selecting a value of a metric with the minimum measurement error from said values of the two or more metrics;
   generating the power control command based on the selected value of the metric; and
   sending the power control command from the receiver to the transmitter.

8. The method according to claim 7, wherein said two or more metrics are any of SINR (Signal to Interference and Noise Ratio), SNR (Signal to Noise Ratio), received signal power density and receiver signal power.

9. The method according to claim 8, wherein the measurement error of SINR is determined according to $$SINR_{err} = SINR_{adjusted} + f(BLER) - SINR_{meas}$$

where $SINR_{err}$ is SINR measurement error; $SINR_{meas}$ is measured SINR; $SINR_{adjusted}$ is adjusted SINR; f(BLER) is SINR offset estimated based on an achieved BLER (BLock Error Rate) and a predetermined BLER target of the signals received.

10. A method of controlling power in a transmitter in communication with a receiver in a wireless communication network, comprising:
    measuring a value of a metric of signals received in the receiver;
    determining a measurement error of the measured value of the metric;
    determining an effective value of the metric based on the measured value of the metric and the measurement error of the measured value of the metric;
    generating a power control command based on the determined effective value of the metric if the measurement error of the measured value of the metric exceeds a threshold; and
    sending the power control command from the receiver to the transmitter.

11. The method according to claim 10, wherein the metric is any one of SINR (Signal to Interference and Noise Ratio), SNR (Signal to Noise Ratio), received signal power density and receiver signal power.

12. A wireless receiver, comprising:
    a first measuring unit for measuring a value of a first metric of signals received in the receiver, the measured value of the first metric usable to generate a power control command;
    a determining unit for determining a measurement error of the measured value of the first metric; and
    a first generating unit for generating the power control command based on the measured value of the first metric if the measurement error of the measured value of the first metric does not exceed a threshold.

13. The wireless receiver according to claim 12, further comprising:
    a second measuring unit for measuring a value of a second metric of the signals received in the receiver, the measured value of the second metric usable to generate the power control command; and
    a second generating unit for generating the power control command based on the measured value of the second metric if the measurement error of the measured value of the first metric exceeds the threshold.

14. The wireless receiver according to claim 13, wherein the first metric is SINR (Signal to Interference and Noise Ratio) and the second metric is any one of SNR (Signal to Noise Ratio), received signal power density and receiver signal power.

15. The wireless receiver according to claim 14, wherein the determining unit is configured to determine the measurement error of SINR according to $$SINR_{err}=SINR_{adjusted}+f(BLER)-SINR_{meas}$$

where $SINR_{err}$ is the SINR measurement error; $SINR_{meas}$ is the measured value of SINR; $SINR_{adjusted}$ is adjusted SINR; f(BLER) is SINR offset estimated based on an achieved BLER (BLock Error Rate) and a predetermined BLER target of the signals received.

16. The wireless receiver according to claim 15, wherein $SINR_{adjusted}$ equals to the measured SINR plus an offset value, and the offset value is adapted according to the achieved BLER.

17. The wireless receiver according to claim 15, wherein f(BLER) is positive when the achieved BLER is lower than the predetermined BLER target and f(BLER) is negative when the achieved BLER is higher than the predetermined BLER target.

18. A wireless receiver, comprising:
a measuring unit for measuring two or more values of metrics of signals received in the receiver, the measured values of the metrics usable to generate a power control command;
a determining unit for determining measurement errors of said two or more measured values of the metrics;
a selecting unit for selecting a value of a metric with the minimum measurement error from said two or more measured values of the metrics; and
a generating unit for generating the power control command based on the selected value of the metric.

19. A mobile terminal comprising:
a wireless receiver including:
a first measuring unit for measuring a value of a first metric of signals received in the receiver, the measured value of the first metric usable to generate a power control command,
a determining unit for determining a measurement error of the measured value of the first metric, and
a first generating unit for generating the power control command based on the measured value of the first metric if the measurement error of the measured value of the first metric does not exceed a threshold.

20. A base station comprising:
a wireless receiver including:
a first measuring unit for measuring a value of a first metric of signals received in the receiver, the measured value of the first metric usable to generate a power control command,
a determining unit for determining a measurement error of the measured value of the first metric, and
a first generating unit for generating the power control command based on the measured value of the first metric if the measurement error of the measured value of the first metric does not exceed a threshold.

* * * * *